US007030794B2

(12) United States Patent
Witte et al.

(10) Patent No.: US 7,030,794 B2
(45) Date of Patent: Apr. 18, 2006

(54) SYSTEM, METHOD, AND SOFTWARE FOR TESTING ELECTRICAL DEVICES

(75) Inventors: Kurt A. Witte, Minnetonka, MN (US); Andrea J. Wright, Minneapolis, MN (US)

(73) Assignee: General Dynamics Advanced Information Systems, Inc., Arlington, VA (US)

(*) Notice: Subject to any disclaimer, the term of this patent is extended or adjusted under 35 U.S.C. 154(b) by 0 days.

(21) Appl. No.: 10/986,431

(22) Filed: Nov. 12, 2004

(65) Prior Publication Data

US 2005/0184899 A1 Aug. 25, 2005

Related U.S. Application Data

(60) Provisional application No. 60/519,367, filed on Nov. 12, 2003, provisional application No. 60/519,344, filed on Nov. 12, 2003, provisional application No. 60/519,470, filed on Nov. 12, 2003.

(51) Int. Cl.
*H03M 1/10* (2006.01)

(52) U.S. Cl. ...................................... 341/120; 341/155

(58) Field of Classification Search ............. 324/158.1, 324/73.1, 763, 765; 438/14, 17, 18; 714/724, 714/733; 341/120, 118, 119, 155
See application file for complete search history.

(56) References Cited

U.S. PATENT DOCUMENTS

| | | | | |
|---|---|---|---|---|
| 5,420,516 | A * | 5/1995 | Cabot | 324/620 |
| 5,578,936 | A * | 11/1996 | Gibson et al. | 324/767 |
| 5,589,765 | A * | 12/1996 | Ohmart et al. | 324/158.1 |
| 6,683,470 | B1 * | 1/2004 | Takeuchi | 324/765 |

* cited by examiner

*Primary Examiner*—Brian Young
(74) *Attorney, Agent, or Firm*—Michael J. Bell; Howrey LLP

(57) ABSTRACT

A method according to a first aspect may include performing a first analog-to-digital (A/D) conversion using an A/D converter. Data associated with this first A/D conversion may be read using a processor. A command may then be issued from a processor when the reading of the data has started. This command may instruct the A/D converter to perform a second A/D conversion. This data may then be stored in a data structure located within a memory device while the A/D converter is performing the second A/D conversion. In addition to performing such pipelined A/D conversions, the present invention may include a system, method and software for filtering out noise in a voltage measurement after the voltage measurement has been converted to a digital signal by omitting the highest and lowest voltage values and averaging the remainder of the voltage values, thereby reducing noise in the voltage measurements.

24 Claims, 7 Drawing Sheets

SYSTEM, METHOD, AND SOFTWARE FOR TESTING ELECTRICAL DEVICES

CROSS REFERENCE TO RELATED APPLICATIONS

This application is a non-provisional application under 35 U.S.C. § 119(e) and hereby claims priority to U.S. Provisional Application Nos. 60/519,367, 60/519,344, and 60/519,470, each of which was filed on Nov. 12, 2003, and each of which are hereby incorporated by reference in their entirety.

FIELD OF THE INVENTION

The invention relates to computer software for use in electrical devices. More particularly, the present invention relates to a system, method and software for performing analog-to-digital conversions and for performing various voltage tests.

BACKGROUND OF THE INVENTION

Analog-to-digital conversions are generally known in the art. In order for a processor to receive and process analog information from, for example, a sensor, the analog data should be converted to digital data. Analog-to-digital converters are used to convert these analog signals to digital signals. In some applications, however, rapid analog-to-digital conversions may be needed.

Currently, software associated with analog-to-digital conversion processes are configured to perform analog-to-digital conversions in a sequential manner, such as is shown in FIG. 5. This may lead to a problem with the robustness of the analog data received from a device under test because of the limitations on the processing time associated with the prior art methods and software for performing analog-to-digital conversions.

One exemplary application that may require rapid A/D conversions is the testing of voltage across a terminal. Generally, rapid analog-to-digital conversions may be required for some applications in which a robust data set must be collected over a short period of time. In other words, the rapid collection of data may depend on a rapid analog-to-digital conversion process. For example, when collecting data from the weapons terminal of a fighter jet, for example, a very fast conversion process may be required to ensure that the voltage signal remains above a predetermined threshold.

What is needed is a system, method and computer software for performing rapid analog-to-digital conversions. Additionally, what is needed is a voltage detector that is capable of reliably determining when stray voltages are present across the terminal of a device under test when the terminal is in an unenergized state. Additionally, what is needed is a voltage detector that is capable of determining when the voltage across the terminals of a device under test is within a predetermined range. Furthermore, what is necessary is a system, method, and software for filtering noise out of an analog signal after it is converted to a digital signal using an A/D converter. While some goals of the present invention have been mentioned, this is not meant to be limiting on the present invention. Any of these exemplary characteristics of systems, software and methods of the present invention may include any one or more of these aforementioned characteristics.

SUMMARY OF THE INVENTION

Thus, the present invention seeks to address at least some of the foregoing problems identified in prior art systems, methods, and software. The present invention includes systems, methods and software that may be applicable in voltage detection systems. In one exemplary embodiment of the present invention, the system, method and software may be directed to the detection of voltage across the terminals of a device under test.

A method according to a first aspect may include performing a first A/D conversion using an A/D converter. Data associated with this first A/D conversion may be read using a processor. A command may then be issued from a processor when the reading of the data has started. This command may instruct the A/D converter to perform a second A/D conversion. This data may then be stored in a data structure located within a memory device while the A/D converter is performing the second A/D conversion.

The invention according to the first aspect may also include receiving the analog input signal at the first A/D converter from a device under test. A method according to the first embodiment of the invention may also include monitoring the received analog input signal to detect the start of a test event. A number of different values associated with the received analog input signal may be stored in digital form. This sorted digital data may then be stored. A determination may be made as to whether the device under test meets a predetermined characteristic threshold. Indications may be displayed based on whether or not the device under test passes a test.

Additionally, the method according to the first embodiment may also include reading data associated with the second A/D conversion using a processor. The process may issue another command when the reading of the data associated with the second analog-to-digital conversion. This command may instruct the A/D converter to perform a third A/D conversion. Data may be stored in a data structure located within the memory device while the A/D converter is performing the third A/D conversion.

The invention according to a second aspect may include processor-readable software code stored on a processor-readable medium. The code may include code to instruct an A/D converter to perform a first A/D conversion. The code may also include code to read data associated with the first analog-to-digital conversion. A second instruction may be initiated using code to perform a second analog-to-digital conversion substantially simultaneous to the reading of the data associated with the first analog-to-digital conversion. The code may also be configured to store data in a data structure located within a memory device while the analog-to-digital converter is performing the second analog-to-digital conversion.

The invention according to a third aspect may include a system for performing a pipelined analog-to-digital conversion process. This system may include an analog-to-digital converter configured to perform analog-to-digital conversions. The system may also include a processor. This processor may be configured to provide instructions to the analog-to-digital converter, which may thereby instruct the A/D converter to begin an A/D conversion process. The instructions may be provided when the processor is reading data from a previous A/D conversion. The system may also include a memory. This memory may be configured to store digital values associated with analog signals received at the A/D converter for further processing.

According to another aspect of the present invention, the system may include a data structure stored on a computer-readable medium. The data structure being configured to received the digital values associated with the analog signals received at the A/D converter for further processing.

The invention according to another aspect of the present invention may include an interface device configured to interface with a device under test. The system may also include an A/D converter. The A/D converter may be configured to perform a pipelined A/D conversion process based on signals received by the A/D converter. The system may also include a microprocessor. This microprocessor may be configured to control the analog-to-digital converter and may be configured to determine whether the voltage across the terminals of a device under test meets a predetermined threshold value.

According to another aspect of an apparatus according to this embodiment of the invention may include an input device. This input device may be configured to change a state of operation of the apparatus. This input device may be, for example, a keypad and the state of operation of the apparatus may include a first testing condition and a second testing condition. The invention according to another aspect may include an alpha-numeric display. The apparatus may be configured to test an aircraft weapons interface. Additionally, the apparatus may include a memory device, the memory device may be configured to store software to filter noise from the voltage signal received from the device under test.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

The present disclosure will flow be described more fully with reference the to the Figures in which various embodiments of the present invention are shown. The subject matter of this disclosure may, however, be embodied in many different forms and should not be construed as being limited to the embodiments set forth herein.

Figure 1:
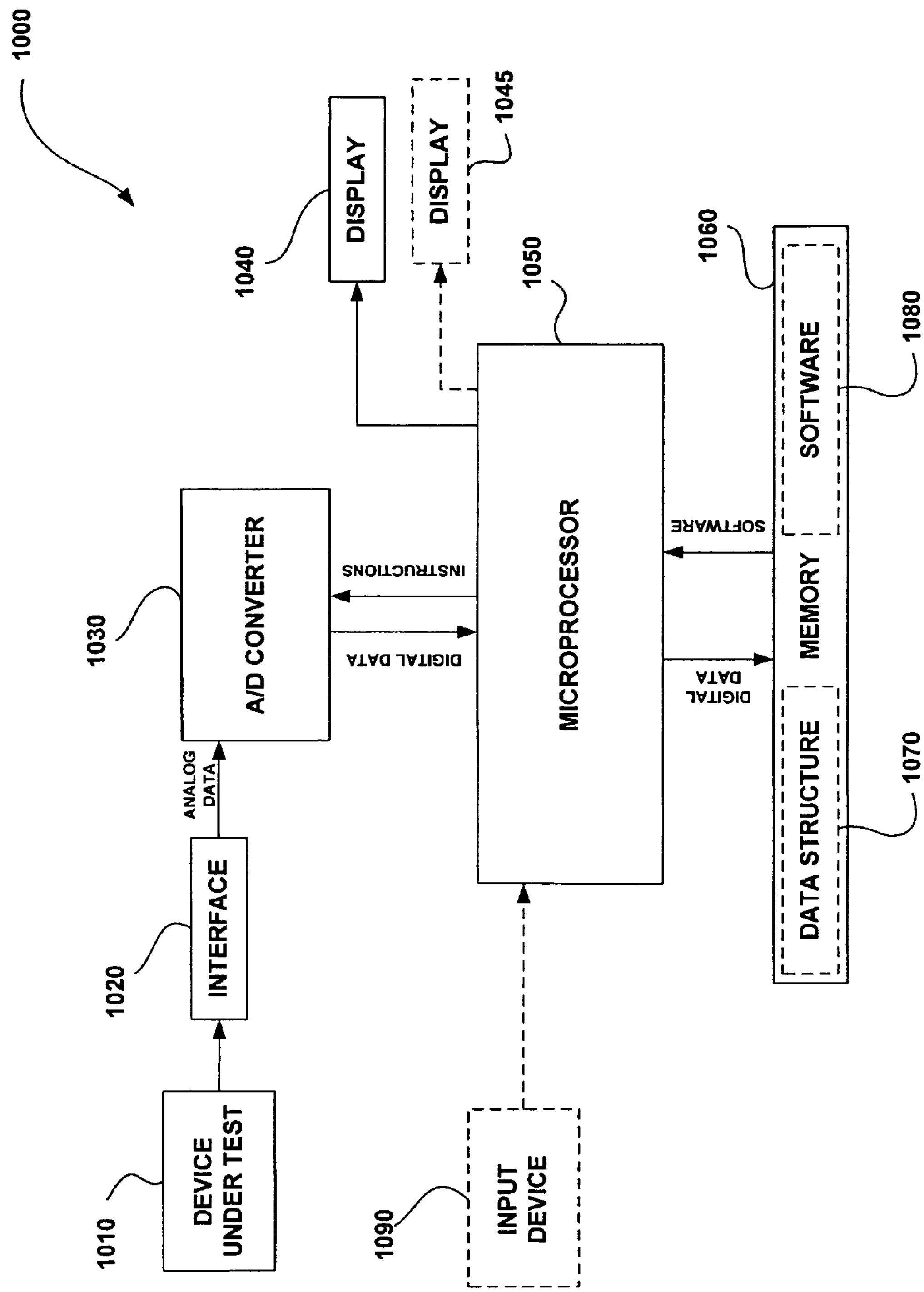
FIG. 1 shows a high-level functional block diagram of an embodiment of the present invention.

FIG. 1 shows a high-level functional block diagram of an embodiment of the present invention. As shown in FIG. 1, a device according to the present invention may include a microprocessor 1050. The microprocessor 1050 may be configured to run software algorithms such as, for example, voltage testing software or software algorithms for controlling the analog-to-digital (A/D) converter 1030. The software may be stored in, for example, memory device 1060. The memory device 1060 may be, for example, non-volatile or volatile memory devices. Memory 1060 may include, for example, a read-only-memory (ROM), random access memory (RAM), a write once, read many (WORM) memory device, semiconductor-based storage, Flash memory, optical storage, phase change storage, magneto-optical storage, or magnetic storage devices. Any type of memory device may be used for memory 1060.

The system 1000 may be configured to perform various tests on a device under test 1010. The tests may be, for example, voltage or current tests on a device under test 1010. The device under test may be, for example, the weapons terminal on an airplane. While tests may be described with respect to the weapons terminal on an airplane as being the device under test 1010, it should be understood that the present invention may be used in connection with a number of procedures and should not be construed to be limited to testing weapons terminals. Additionally, the present invention should not be construed to be limited to performing voltage testing as any type of electrical testing may be performed using the present invention. Additionally, some of the software according to embodiments of the present invention may be used to convert analog signals to digital signals in any application where rapid A/D conversion is required or otherwise desirable.

The interface 1020 may be configured to test the voltage across terminals of a device under test 1010. Based on the voltage present at the interface 1020, an analog signal may be transmitted to an A/D converter 1030. The A/D converter 1030 may be configured to received instructions from the microprocessor 1050. These instructions may be configured to instruct the A/D converter 1030 to perform an A/D conversion on the signal received from the device under test 1010. After the A/D converter 1030 converts the analog signal received from the device under test 1010 via the interface 1020, digital data may be transmitted to the microprocessor 1050 so that the data may be read by the microprocessor 1050 and stored in a memory device 1060. The memory device 1060 may include a data structure 1070. The data structure 1070 may be configured to receive digital data from the microprocessor 1050 and store the digital data.

In addition to being configured to store data values, the memory device 1060 may be configured to store software instructions 1080. As will be described herein, the software 1080 may include instructions for performing pipelined A/D conversions and/or for performing a filtering of the digital values received from the A/D converter 1030 after an A/D conversion process has been completed. Various software 1080 associated with a number of different tests may be stored in the memory 1060.

According to one embodiment of the invention, the system 1000 may include an input device 1090. The input device 1090 may permit a user to select one of a number of different tests to perform on a device under test 1010. Additionally, the input device 1090 may also include a power switch, button, knob, or the like so that the user may turn the device on or off or otherwise activate the device (e.g., awakening the device from a power conservation mode). According to one embodiment of the present invention, the input device may include, for example, a keypad so that the user may selectively determine which software programs the microprocessor 1050 will implement.

According to one exemplary embodiment of the invention, the system 1000 may include a self-test (ST) button. The ST button may be configured to initiate a self-test of the system 1000. During the self-test, the system 1000 may perform a self-check of the condition of the various circuits and circuit breakers within the system 1000. This self-test may also include checking the battery and determine the voltage of the battery and display the resultant battery voltage on the display for the user. In this manner, the user may become aware of a low battery state and may exchange the battery for a recharged battery or new battery, for example. The self-test may fail if the battery voltage is below a predetermined level. This predetermined level may be based on whether the battery voltage is low enough to cause anomalies in the tests. The system 1000 may be configured to illuminate the test status indicator to display an indicia of whether the device passes the self-test. In the event of failure, the system 1000 may be configured to display an indicia of failure or may not illuminate an indicator at all. Other methods such as displaying a "failure" indication on an LED or LCD screen, producing an audible indication or any other type of indication may be used to convey to the user that the system 1000 has either passed or failed the self-test or any other test discussed herein.

The system 1000 may also include an adapter test (AT) button or input device (e.g., a lever, knob, switch). An AT input device, such as, for example, a button, may be configured to initiate an adapter test. During this test, the system 1000 may produce a DC test current between an input signal pin and a return signal pin. The system 1000 may then be configured to measure the resistance on the signal path and may display it to the user. The resistance may be displayed in Ohms, for example. Alternatively, the resistance may be displayed in kilo-Ohms. Various other impedance or resistance measures, current measures (such as, for example, amperes) or other figure of merit may be displayed. In one embodiment of the present invention, the system 1000 may be configured to determine if the resistance is a predetermined resistance. In one embodiment of the invention, the system 1000 may be configured to determine if the resistance is within a predetermined tolerance of a predetermined resistance. In one exemplary embodiment of the invention, the resistance may be 5 Ohms and the predetermined tolerance may be +/−1 Ohm. Numerous other resistances may be contemplated and employed in connection with the present invention as may various other predetermined tolerances depending on the application that the system 1000 is being used for. For example, milli-Ohms may be the unit of measure and the predetermined tolerance may be, for example, +/−10 milli-Ohms. If the resistance is within the predetermined tolerance of the predetermined resistance, the system 1000 may be configured to display an indicia that the device has passed the test. For example, an LED or other type of indicator may be illuminated to convey to the user that the device has passed the test. Alternatively, the word "Pass", the letter "P", some other alphanumeric display, or other indication may be displayed on a display for the user to determine whether the device under test has passed the test. Additionally, according to one exemplary embodiment of the present invention, a display means may not be illuminated, conveying to the user that the device under test has failed the test. As described in detail above, various other indications that the device has failed the test may be utilized in connection with the invention, such as, for example, tactile feedback, audible feedback, and visual feedback. To let the user know which mode the system 1000 is operating in, an LED or other indicator may let the user know that the system 1000 is operating in, for example, an AT mode.

The system 1000 may also include a stray voltage test (SV) button. The SV button may be configured to instruct the system to perform a stray voltage test on the system 1000. The SV test may be configured to test for the presence of the following exemplary voltage levels between the input signals and the input signal returns:

Positive DC voltage levels of +120+/−6 millivolts and greater for 1.00+/−0.25 milliseconds or longer;

Negative DC voltage levels of −120+/−6 millivolts and less for 1.00+/−0.25 milliseconds or longer; and AC voltage levels of 90+/−10 millivolts RMS and greater at 500 Hz.

Of course, each of these exemplary voltage levels is exemplary and are non-limiting. For example, the voltage level may be higher or lower depending on the particular application that the system 1000 is being used for. This test may be configured to continuously display the maximum magnitude of the voltage. This may be measured in any units of measure, such as, for example, volts. Any other measure of electrical potential may be used in connection with the present invention. Furthermore, the display may be configured to display the type of voltage being displayed. For example, the voltage may be an alternating current (AC) voltage, a root mean square (RMS) voltage, or a direct current (DC) voltage. Additionally, according to one embodiment of the present invention, the system may be configured to display the polarity of the voltage from the device under test. As with the previous tests, indications may be displayed to convey to the operator of the device regarding whether the device under test passed the test or not. Optionally, the system 1000 may be configured to provide a notification to the user as to which test is being performed, such as, for example, a light indicating that the SV test is being performed.

According to yet another embodiment of the present invention, the system 1000 may be configured to perform an Electro Explosive Device (EED) test, using an EED input means. The input means may be a knob, button, switch, voice activated system, or any other suitable input means for providing an indication of the user's intent to the software and hardware of the system 1000. the EED test may include scanning or otherwise looking for an input voltage of at least five volts. This voltage may be any other acceptable voltage, the use of five volts is intended to be merely exemplary. The system 1000 may be configured to display the message "INP<5 V", or other appropriate message on the display so that the user knows that the input does not exceed a certain value, in this case five volts, and that the test will not continue to proceed until this condition is meet. It should be understood that any other voltage may be used in connection with the present invention depending on the application. When this condition is satisfied, the test may be configured to apply a load to the circuit and then determine what the resultant voltage is following the application of the load. For example, according to an exemplary embodiment of the present invention, the load may be 2.5 amps. The system 1000 may be configured to determine whether or not the resultant voltage has dropped below a predetermined voltage. For example, the system may optionally be configured to determine whether the voltage drops below 5+/−0.5 volts.

As discussed above, however, any voltage may be used in connection with the present invention.

The test may be configured to determine whether, at any time, the voltage drops below the threshold voltage. The test may be, for example, between 5 ms and 1 s in duration. Alternatively, the rest may be, for example, 11 ms long. The test may be any suitable duration. If the EED test determines that the voltage has dropped below the predetermined voltage level, the system 1000 may be configured to disconnect the load and display an indication that the device has failed the test. Various indications may be displayed to the user as described above to convey to the user whether the user has passed the test or not.

The system may also include a number of other tests, such as, for example, a first voltage test. This first voltage test may be initiated by the first Presence of Voltage button (PV1). The PV1 button may be configure to initiate a Presence of Voltage 1 Test. The PV1 test may be configured to determine if a positive voltage of, for example, 22+/−1 volts DC or greater is applied across input signal and input signal return. Of course, these voltages are merely exemplary and any presence of voltage test may be designed that includes various other alterative voltages. While this test is running, the PV1 Test Select Indicator may be illuminated in the same manner as discussed above with respect to the other tests. The PV1 is a continuous test. The system may be configured to constantly display the current voltage level detected by the system 1000. Whenever the voltage is, for example, 22+/−1 volts DC or above an indication may be used to convey the status or results of the test to the user in the same manner as described above.

The system may also include a second voltage test. This second voltage test may be initiated by a second presence of voltage (PV2) button or other input means. The PV2 test may be configured to detect two voltages simultaneously. This PV2 test may be configured to check for a positive voltage of, for example, 22+/−1 Volt DC or greater applied across the input signal and the input signal return and a positive voltage of, for example, 3.5 Volts DC or greater across input signal and input signal return. As described above, these voltages are merely exemplary, and may be tailored to any type of system depending on the desired tests. Whenever one of the two voltages is greater than or equal to the threshold, an indication of this fact may be conveyed to the user. According to one embodiment of the present invention, the system 1000 maybe configured to run the PV2 test continuously until another test is selected. Furthermore, this test may be restarted with the Reset button or may be restarted when the PV2 button is pressed again.

The system 1000 may also include a reset button. This reset button may be configured to rerun the test currently running or the test that most recently completed. The reset of a test may include the resetting of any initialization procedures for that test and a reset of all LED indicators. The reset buttons may also reset the circuit breaker if it has been tripped. The system 1000 may also include a display button. The system may be configured to allow the user to turn on or off the display, as well as adjust its brightness. The present invention may be configured to have a number of different brightness levels. According to one exemplary embodiment of the present invention, the system may include four brightness levels: Off, Low, Medium, and High. Each key press may be configured to increase the brightness level by one increment, and if the current level is high, the next brightness level will be off. Various other methods of changing the brightness level of the display may be apparent including the use of a dial, knob or other device for changing the brightness level. If the current brightness level is off, the next key press may turn the displays on at the low level of brightness. Additionally, buttons may be provided to change the color of the display or multiple buttons may be provided to change various aspects of the display including, but not limited to the contrast, brightness, or color of the display.

After the device under test 1010 has been tested, the result of the test may be displayed using display 1040. Display 1040 may be, for example, an light emitting diode (LED) indicator light. The display 1040 may be configured to display an indicia of whether or not the device passes the test. For example, the system 1000 may be configured to determine if the voltage across the terminals of a device under test 1010 is at a predetermined level. In one application in which the system 1000 is configured to test the weapons interface on an airplane this predetermined voltage used with an EED test may be, for example, +/1 120 millivolts, +3.5 volts, and +22 volts. These voltages, of course, are merely exemplary and the predetermined voltage may differ depending on the application that the system 1000 is being designed and utilized for. When the voltage is above a predetermined threshold, the display 1040 may be configured to display an indicia that the device under test 1040 passed the test. This indicia may include displaying a green light via the display 1040. According to another embodiment of the present invention, the system 1000 may be configured to display a first indicia if the device passes the test and a second indicia if the device does not pass the test. For example, a first indicia may include a displaying a green light or some other visual indicia and a second indicia may include displaying a red light using the display 1040. According to another embodiment of the present invention, the system 1000 may include a second display 1045. The second display may be, for example, a liquid crystal display (LCD) and may be an alphanumeric display. This display 1045 may show various codes indicating types of device failures. Additionally, the display 1045 may be configured to display the test result, such as, for example, a specific current or voltage across the terminals of the device under test 1010.

Figure 2:
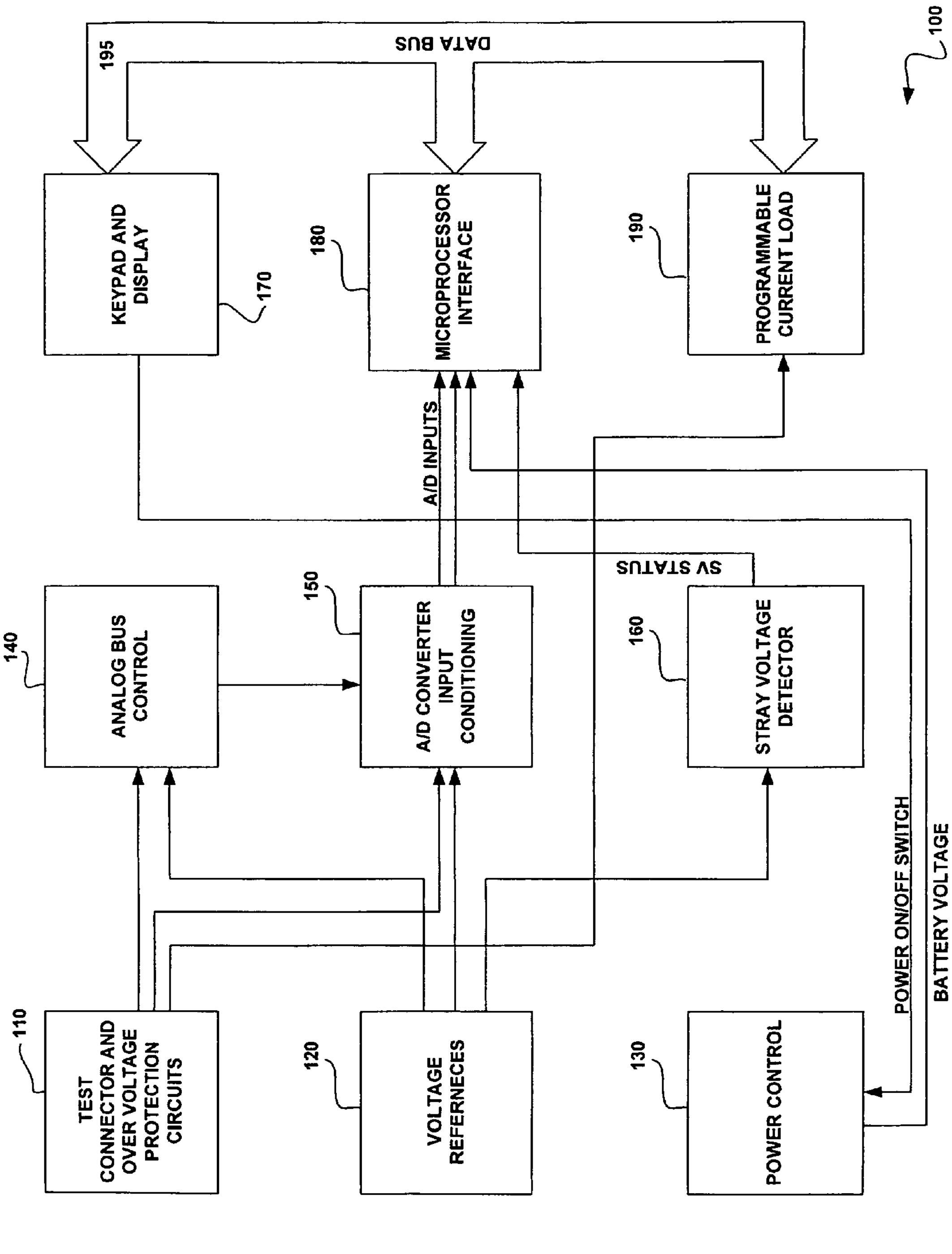
FIG. 2 shows a more detailed functional block diagram of a voltage detector according to an embodiment of the present invention.
Figure 3:
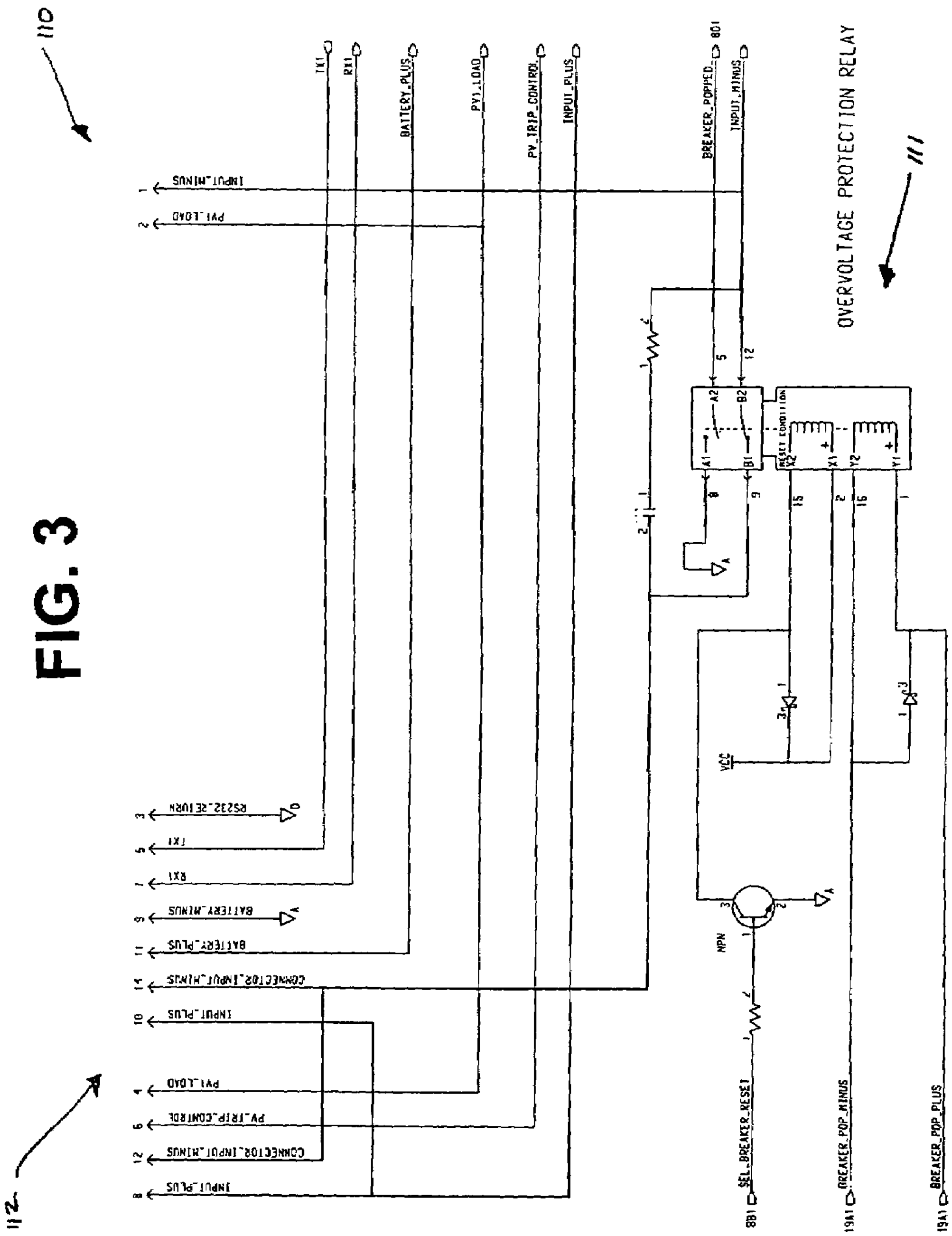
FIG. 3 shows a wiring diagram for the test connector 110 and over voltage protection circuit according to an exemplary implementation of the present invention.

FIG. 2 shows a more detailed functional block diagram of a voltage detector according to an embodiment of the present invention. As shown in FIG. 2, the system 100 may include a test connector 110. The test connector 110 may also include circuitry for over voltage protection of the system 100. This test connector 110 may include an interface that is specifically designed to test a particular device under test (not shown). According to one exemplary use of the present invention, the test connector 110 may be configured to plug into the weapons interface of an airplane. Signals received from the weapons terminal of the airplane may be provided to pins in the test connector 110. While the test connector 110 may include pins, it should be understood that the test connector may be wired to the device by any number of alternative means, such as, for example, direct wiring or contact plates etc. FIG. 3 shows a wiring diagram for the test connector 110 and over voltage protection circuit according to an exemplary implementation of the present invention. As shown in FIG. 3, the test connector may include a number of pins 112. These pins 112 may be configured to interface with a terminal of a device under test (not shown). As one of ordinary skill in the art will appreciate, based on the teachings of the present disclosure that numerous pin configurations may be devised based on the nature of the device under test. Some of pins 112, such as, for example, pins 12 and 14 may be coupled to the over voltage protection circuitry 111. The pins may be configured to transmit voltage signals to, for example, the analog bus control 140 and the A/D converter input circuit 150, as will be described in more detail below. The over voltage protection circuits 111 may be configured to monitor the circuits within the system 100 that need protection from excessive voltages. In the event that such voltages have been detected, the over voltage protection circuit 111 may be configured to open a relay switch so as to disconnect the input from the test connector 110. Information entering and exiting the test connector 110 may include test signals form the device under test. Additionally, self-test signals may enter and exit the test connector 110.

Referring back to FIG. 2, the system 100 may also include an analog bus control circuit 140. The analog bus control circuit 140 may include, for example, a set of solid-state relays to connect different circuits within the system 100 to perform a variety of different tests. For example, test input signals from the device under test may be transmitted via the test connector 110 to the A/D conversion circuits 150. Information entering the analog bus control circuit 140 may include control signals from the microprocessor (not shown), and signals from the various circuits within the system 100 for permitting the system 100 to perform different tests.

The system 100 may be configured to perform an automatic calibration. To perform such an automatic calibration, the system 100 may use, for example, voltage reference circuits 120. Precision voltage references may be used to automatically calibrate the A/D converter during self-test procedures. The voltage reference circuits may be provided with power and may output known voltage values to the A/D converter input circuit 150, the stray voltage detection circuit 160 and the analog bus control 140.

The A/D converter input circuit 150 may include a number of different operational amplifier circuits to provide software-selectable gain and offset values to the input signals connected to the A/D converters for the various tests that are to be performed by the system 100. Information entering the A/D converter input circuit 150 may include control signals from the microprocessor interface 1080 and may also include conditioned test input signals to the A/D converters. These input signals may then be converted to digital form and may be transmitted to the microprocessor interface 180 for further processing and storage.

The system 100 may also include a stray voltage detection circuit 160. The stray voltage detection circuit may be configured to be used in connection with particular tests. One exemplary test that the stray voltage detection circuits 160 may be used for is the detection of stray voltages due to error conditions that may occur in systems within the device under test. For example, the stray voltage detection circuit 160 may be configured to monitor the terminals of a device under test to determine whether the device under test is producing excessive voltages for an excessive time period. Alternatively, the stray voltage detection circuit 160 may be configured to determine if the device under test is producing excessive voltages or producing voltages for an excessive time period. The stray voltage detection circuit 160 may be configured to receive test signals from the test connector 110 and may be configured to output a test bit. The test bit may be a stats signal that is indicative of whether the device under test passes or fails a predetermined test.

The system 100 may also include power control circuit 130 that includes power on/off circuits. Furthermore, the power control circuit 130 may include a battery preconditioner circuit configured to reduce the heat dissipated and provide a more efficient conversion of battery power thereby maintaining a constant voltage while extending battery life. Furthermore, the power preconditioner circuits 130 may also include charge pumps (not shown) that are used to generate operating power voltages for the system 100. The power control circuits 130 may be configured to receive on/off signals from an input device, such as for example, the keypad 170. Furthermore, the power control circuits 130 may be configured to output the operating voltage for the system 100.

The system 100 may also include a microprocessor interface circuit 180. The microprocessor interface circuit may be configured to receive power, control, and data signals connecting the circuitry of the system 100 with the microprocessor (not shown). The microprocessor may be, for example, a single board computer. According to one preferred embodiment of the system, the processor may be and LP3100 Single Board Computer (SBC) made by Z-World, Inc. Of course, the microprocessor may be any type of microprocessor and should not be construed to be limited to a single board processor. Information entering the microprocessor interface may include, for example, operating power, digital I/O and control signals. According to one embodiment of the present invention, the A/D converters may be disposed on a SBC.

The system 100 may also include a display and keypad 170. The display may be, for example, a LED. Alternatively, or in addition, the display may be an alphanumeric display, such as, for example, an LCD or LED display. A keypad may be used to control the system 100 and may be used to provide instructions to the microprocessor as to which tests to perform. According to a one implementation of the invention, the keypad 170 may include nine buttons. Various buttons and input devices are described above, and may include, for example, a reset button, a PV1 button, a PV2 button, an EED button, and ST button, and an AT button, to name a few. As discussed above, any type of input may be substituted for a button, such as, for example, knobs levers etc. Furthermore, additional buttons and tests may be employed in connection with the present invention. While nine buttons may be used, it should be understood that any number of buttons or input devices may be used in connection with the present invention. In addition or instead of using buttons, various other inputs may be used, such as, for example, switches or dials. The keypad and display 170, the microprocessor interface 180, and the programmable current load interface circuits may be coupled to one another via data bus 195 to permit the exchange of information and the control of the system 100. According to an exemplary embodiment of the present invention, the data bus 195 may be, for example, an eight bit bidirectional data bus and having a signal level, such as for example, 3.3 volts.

The system 100 may also include a programmable current load 190. The programmable current load may by configured to perform a Electro-Explosive Device (EED) test, which applies a current load to a signal from the device under test, such as, for example, an airplane, and may verify that the airplane signal can provide sufficient voltage and current for a sufficient time duration. According to one exemplary embodiment of the present invention, an EED test may be performed. This EED test may be configured to verify that the weapons interface on an aircraft under test can provide a sufficient voltage across the terminals of the interface for a sufficient time period to fire the weapon. This time period may be, for example, 11 ms. The pulse may have a duration of 11 ms and the entire pulse may need to remain above 5 volts for the entire duration of the pulse. These conditions may need to be met, according to this exemplary embodiment of the present invention when a load of 2.5 amperes is applied as the current load.

Figure 4:
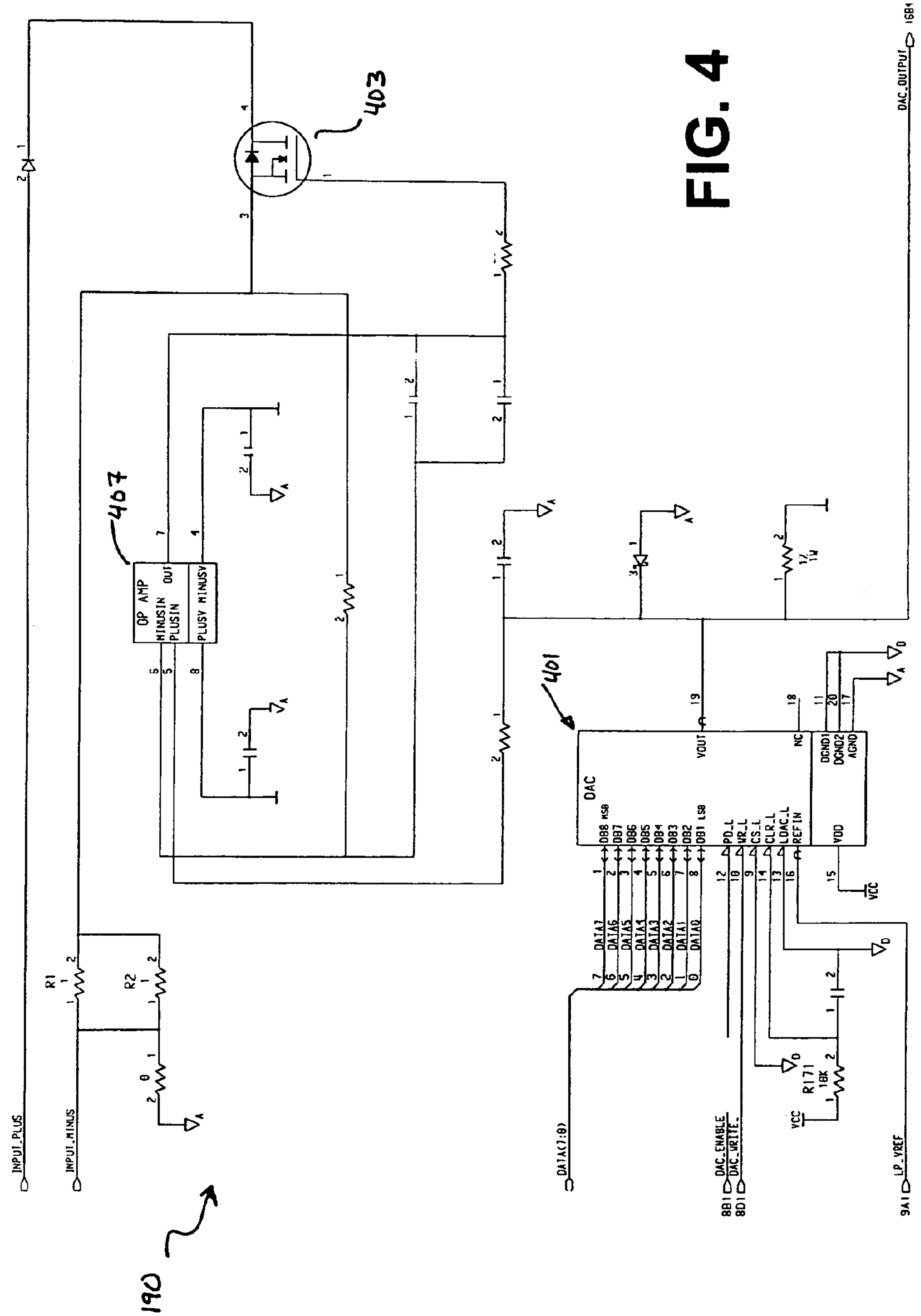
FIG. 4 shows a wiring diagram of a programmable current load circuit according to one aspect of the present invention.

An exemplary embodiment of the programmable current load circuit is shown in FIG. 4. The programmable current load circuit as shown in FIG. 4 includes a Metal-Oxide Semiconductor Field Effect Transistor (MOSFET) 403. This MOSFET may be configured to control the current flow between its source and a current drain (e.g., as shown in FIG. 4, pins 3 and 4), based on the voltage presented at its gate input (e.g., pin 1). An operational amplifier 407 may also be included in the programmable current load circuit shown in FIG. 4. This Op-Amp 407 may be configured to control the voltage presented to the gate input (pin 1) of the MOSFET 403. Current sense resistors R1 and R2 may be configured to develop a voltage corresponding to the current passing through MOSFET 403. External feedback components may be configured to permit the Op-Amp 407 to control MOSFET 403 so that the voltage generated by the current passing through R1 and R2 is equal to the control voltage presented to the positive input of the Op-Amp 407. The programmable current load circuit shown in FIG. 4 also may include a digital-to-analog (D/A) converter 401. The D/A converter 401 is configured so that the analog output from the D/A converter can control the voltage presented to the plus input of Op-Amp 407. By this method, digital values loaded into the D/A converter 401 via the processor interface from the microprocessor (not shown) may be configured to control the current flow between the source and drain of the MOSFET 403.

While a specific embodiment of the programmable current load circuit is shown in FIG. 4, it should be understood that the ordinarily skilled artisan may embody a programmable current load circuit in a number of different fashions. For example, alternative components that may be used to implement a substantially similar circuit may include a current sensing device which may be configured to perform the functions of the resistor (R1 and R2). This current sensing device may be configured to act as an input to a control amplifier, which may be configured to perform the function of the Op-Amp 407 that controls a current limiting device, which would be configured to perform the function of the MOSFET 403. Furthermore, a digitally programmable device may be configured to perform the function of the D/A converter 401, which has a primary purpose of providing a reference input to the control amplifier.

Figure 5:
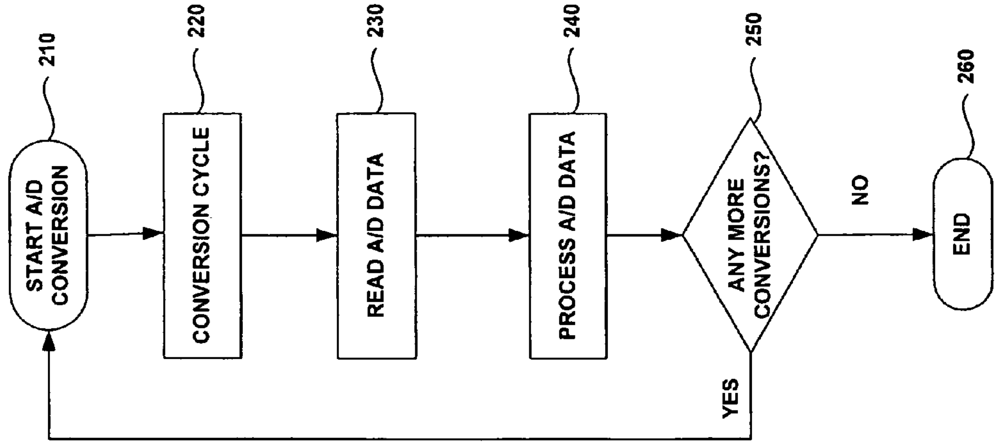
FIG. 5 shows a flow chart of a prior art method of performing A/D conversions.

Various software algorithms may be designed to be implemented by the processor in a system according to the present invention. The software according to the present invention is advantageous over prior art software for controlling A/D converters because it permits rapid conversions of the analog signals to digital format effectively using the time that the A/D converter would otherwise be inactive to convert additional analog data to digital data. FIG. 5 shows a flow chart of a prior art method of performing A/D conversions. In the prior art systems, an A/D conversion may be initiated by the processor as shown by the start block 210. The A/D converter may then perform its typical conversion cycle, step 220. Once the conversion is complete, the processor may be configured to read the digital data from the A/D conversion step, step 230 and may be configured to process the data, step 240. Processing may include, for example, tasks such as storing the data in a memory data structure. This data may be stored for either digital filtering or threshold detection processes that are performed by the system. After the data is processed, step 240, the software may be configured to determine if there is more data that needs to be converted from analog-to-digital form, decision 250. If there is more data that needs to be converted form analog to digital form, the algorithm will cause the microprocessor to transmit an instruction to the A/D converter to start the next A/D conversion process, step 210. If all of the analog data has been converted to digital form, then the program will end, step 260 and the data may be further processed by additional algorithms.

Figure 6:
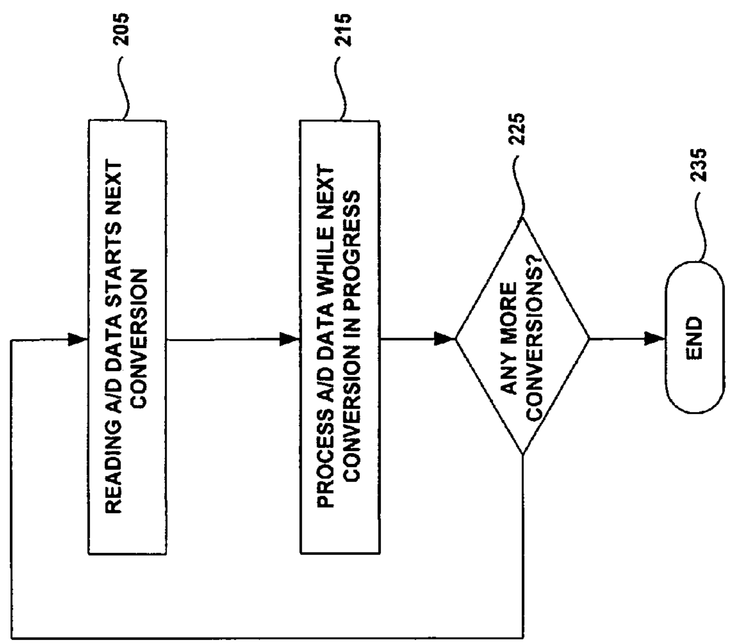
FIG. 6 shows a flow chart of a method for performing pipelined A/D conversions.

The conversion process of the present invention may utilize the down time of the A/D converter to perform additional A/D conversions thereby increasing the amount of data that may be input into the system in a given time period. FIG. 6 shows a flow chart of a method for performing pipelined A/D conversions according to an exemplary embodiment of the present invention. The program may be loaded and the A/D conversion program may be initialized. This initialization may be caused by the microprocessor issuing a command over a serial interface to the A/D converter. This A/D converter may be located on a SBC or in some other integrated circuit, for example. This SBC may be, for example, a LP3100 SBC.

The A/D converter may be used to perform a first A/D conversion (not shown). Once this first A/D conversion has taken place, the data may be read by the processor. The reading of the data may be configured to cause the processor to issue a command or instructions to the A/D converter to begin another A/D conversion process, step 205. The microprocessor may read the A/D conversion results over a serial interface that carries data between the A/D converter and the microprocessor. The A/D converter according to one embodiment of the present invention may be accessed over a serial interface. This serial interface may be controlled by a microprocessor. The microprocessor may be configured to generate a clock pulses on the serial interface while presenting command data to the serial interface to issue conversion commands to the A/D converter. The microprocessor may generate these clock pulses on the serial interface while reading conversion result data from the interface, thereby reading the results of a completed conversion. A pipelined A/D conversion according to an embodiment of the present invention may be configured to shorten the conversion, reading and processing time by issuing a new conversion instruction to the A/D converter on the same clock pulses used to read the results of the previous A/D conversion. Substantially simultaneously with the reading of the data, the processor may issue a command or instruction to the A/D converter to convert more analog data into digital form. Therefore, as shown in FIG. 6, once the first A/D conversion process takes place the program continues to loop back and covert additional analog data to digital format.

Once the A/D data has been read, step 205, the data may be processed while the next A/D conversion is taking place. Processing the data may include storing the digital data received from the A/D converter in a data structure for use in determining the results of a test. For example, the processing of the data, step 215 may include storing the data in a data structure for use in a digital noise filtering algorithm of for threshold detection while the A/D converter performs the next A/D conversion. After the data is stored the algorithm will continue looping until the analog signal to the interface and therefore, the input of the A/D converter is absent or the test is complete, decision 225. The algorithm will terminate when the test is complete, block 235.

Figure 7:
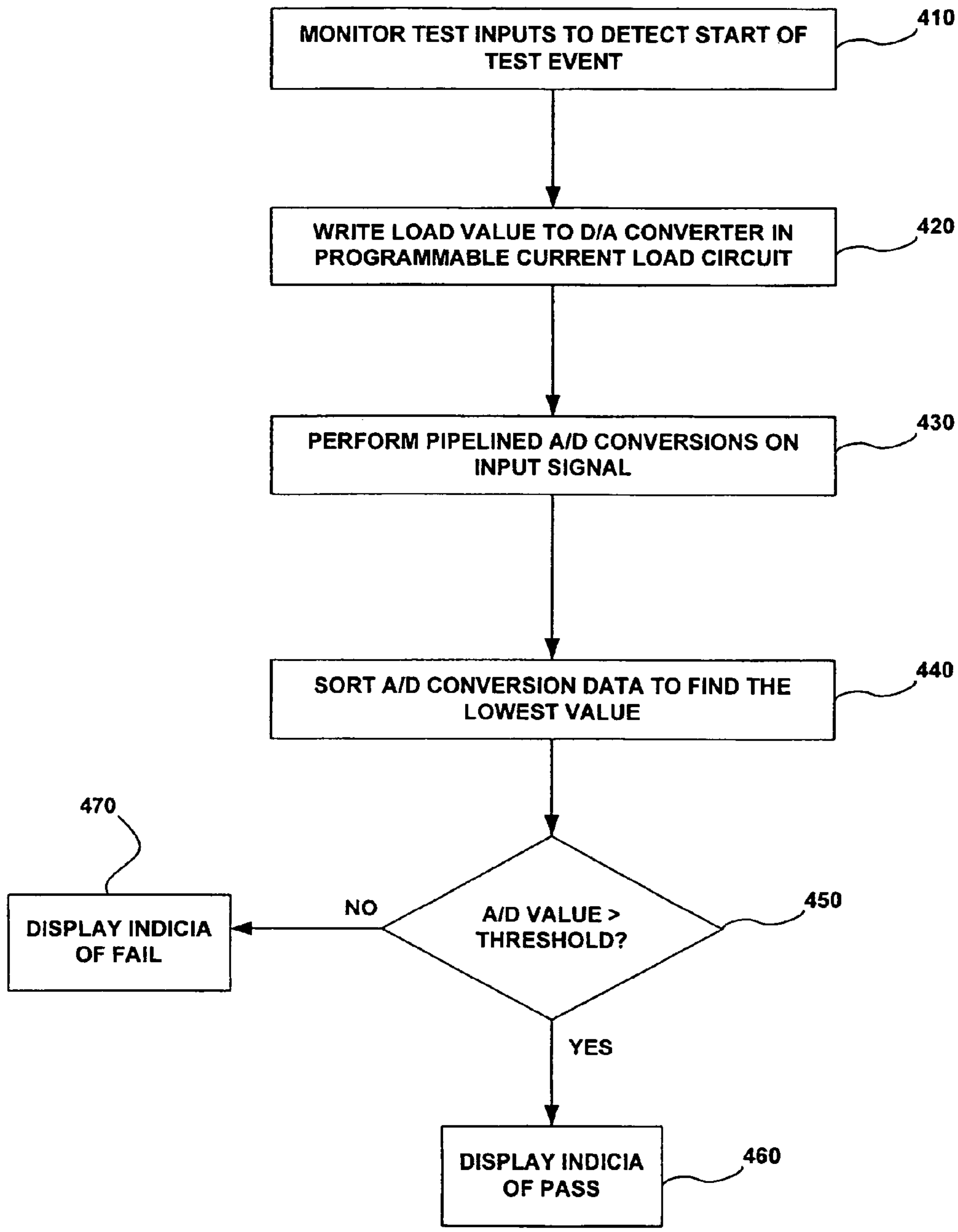
FIG. 7 shows a flow chart of a method for performing a voltage test on a device under test.

FIG. 7 shows a flow chart of a method for performing a voltage test on a device under test. The method for performing a voltage test on a device under test may include a step of monitoring the test inputs to detect the start of a test event, step 410. One example of a test event may include the generation of an EED pulse from an aircraft. Thus, in this embodiment of the present invention, the test event may include the detection of an EED pulse from an aircraft, step 410. The microprocessor within the system may be configured to set the bus control circuits and the A/D converter input conditioning circuits to connect the signal from the device under test to the A/D conversion circuitry. The circuitry within the system may perform the applicable A/D conversions and check the results until it detects a reading above a predetermined threshold. The occurrence of a reading above the threshold may indicate the start of an EED pulse from the aircraft.

The algorithm may include a step of writing the load value to the D/A converter in the programmable current load circuit. The microprocessor may be configured to write the software programmable current load into the D/A converter. Loading a digital value into the D/A converter (shown in FIG. 4, 401) may cause the output of the D/A converter 401 to assume an analog voltage value determined based on the digital value. The output voltage of the D/A converter may provide a reference input to an operational amplifier, as described with respect to FIG. 4, above. This may be used to provide a control voltage to the input gate of a MOSFET. This may cause the MOSFET to pass sufficient current for the feedback voltage from, for example, current sensing resistors to equal the output voltage of the D/A converter. The current load requirement for a specific test may be specified by the customer or developer. This may ensure that an adequate test for the device under test. The digital value to be loaded into the D/A converter to produce the correct current load is stored in memory as part of the code associated with at least one of the tests that the system may be designed to perform. This means that the programmable current load may be applied to the input signal from a device under test for the time duration of a test. This test duration may be, for example, the time duration from after an EED pulse is detected until the test has been completed. Applying a specific current load for the duration that an input pulse is being tested may be a requirement specified by a particular use of the present invention. Thus, according to one embodiment of the present invention, the system may be configured to permit the running of multiple tests some of which have different current load requirements because of the use of the digitally-programmable current load circuit and associated software.

The microprocessor may be configured to perform the pipelined A/D process on the analog test signal received from the device under test, step 430. An exemplary pipelined A/D conversion process is shown in FIG. 6. The algorithm may then sort the A/D values thereby identifying the lowest value, step 440. The code for performing this sort may be performed using, for example, a heap sort program.

The algorithm may be configured to determine if a value associated with the A/D conversion is greater than a predetermined threshold, step 450. In one exemplary embodiment of the present invention, the lowest value of the number of values obtained from the A/D conversion process may be compared to a test threshold. If the value is greater than the test threshold, then a pass condition on the test status indicator may be displayed, step 460. Additionally, a display, such as an alphanumeric display, may be used to display the results of the test. If the value does not exceed a predetermined threshold, then a test fail condition may be displayed, step 470. In one exemplary embodiment of the invention, the test fail condition may be displayed, step 470, when the lowest value fails to exceed a test threshold. According to one embodiment of the invention, if the device under test fails to produce a signal that meets a predetermined threshold, the system will not illuminate an LED. If the device under test produces a signal that meets the predetermined threshold, then the system will illuminate the LED.

Figure 8:
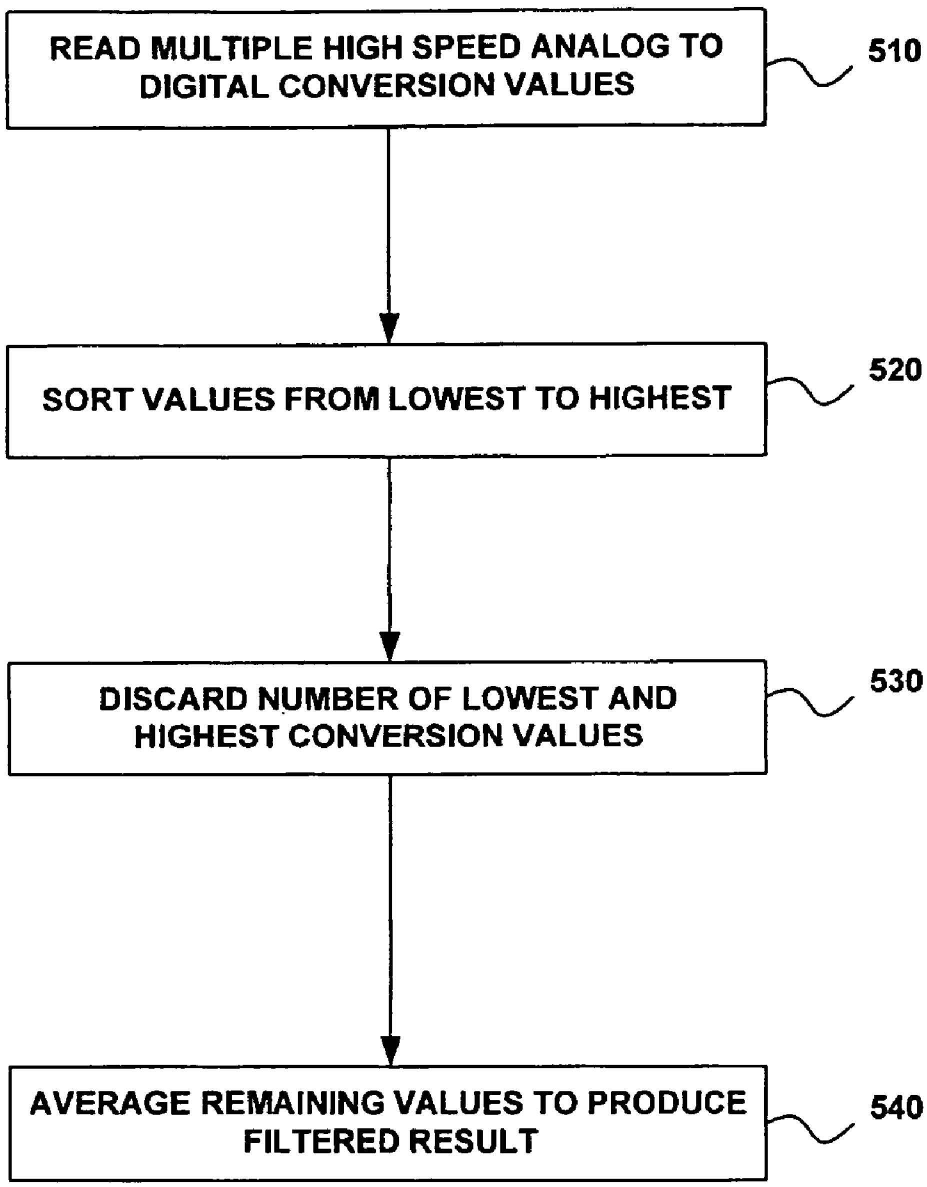
FIG. 8 shows a flow chart of a method for filtering noise out of a signal.

FIG. 8 shows a flow chart of a method for filtering noise from a signal. The method of digital noise filtering according to one embodiment of the present invention may include reading multiple high-speed A/D conversion values, step 510. These high-speed A/D conversion values may be obtained using the pipelined A/D conversion process FIG. 6. These values obtained following the A/D conversion may be sorted from lowest to highest, step 520. Alternatively, the values may be sorted in any other meaningful manner. Following the sorting of the values from the A/D conversion, the value that is the highest and the value that is the lowest may then be discarded, step 530. The remainder of the values may then be averaged to produce a filtered result, step 540. Based on this filtering technique the values that may attribute most to perturbations within an averaging of the values may be discarded and may result in a more dependable average of the voltage values received from the device under test.

Numerous other system configurations for a detector may be implemented based on the present disclosure. While the invention has been described with reference to specific preferred embodiments, it is not limited to these embodiments. For example, while certain embodiments of the invention were described with respect to the use of a system for performing voltage measurements, the system may be used to measure current or various other figures of merit of a device under test. Additionally, while the present invention has been described with respect to testing the weapons terminal of an aircraft, it should be understood that the present invention may be configured to test various figures of merit of various electrical devices. Additionally while some specific tests are described, the invention is in no way limited to the performance of those specific tests. For example, the programmable current load circuit may be configured to test electrical power sources such as batteries or power supplies. The invention may be modified or varied in many ways and such modifications and variations as would be obvious to one of skill in the art are within the scope and spirit of the invention and are included within the scope of the following claims.

What is claimed is:

1. A method comprising:

performing a first analog-to-digital conversion with an analog-to-digital converter;

reading data associated with the first analog-to-digital conversion using a processor;

issuing a command from the processor when the reading of the data has started, the command instructing the analog-to-digital converter to perform a second analog-to-digital conversion; and storing data in a data structure located within a memory device while the analog-to-digital converter is performing the second analog-to-digital conversion.

2. The method of claim 1, further comprising:

receiving an analog input signal at the first analog-to-digital converter from a device under test.

3. The method of claim 2, further comprising:

monitoring the received analog input signal to detect the start of a test event;

storing a plurality of values associated with the received analog input signal in digital form;

sorting the stored digital data; and determining if the device under test meets a predetermined characteristic threshold.

4. The method of claim 3, wherein the predetermined characteristic threshold is a predetermined voltage threshold.

5. The method of claim 3, wherein if it is determined that the device under test meets the predetermined characteristic threshold, displaying an indicia that the device passed.

6. The method of claim 3, wherein if it is determined that the device under test meets the predetermined characteristic threshold, displaying an indicia that the device passed; and if it is determined that the device under test does not meet the predetermined characteristic threshold, displaying an indicia that the device failed.

7. The method of claim 1, further comprising:

reading data associated with the second analog-to-digital conversion using a processor;

issuing a command from the processor when the reading of the data associated with the second analog-to-digital conversion has started, the command instructing the analog-to-digital converter to perform a third analog-to-digital conversion; and storing data in the data structure located within the memory device while the analog-to-digital converter is performing the third analog-to-digital conversion.

8. The method of claim 1, wherein the reading step and the issuing a command step are performed using a clock signal from the microprocessor.

9. Processor-readable software code stored on a processor-readable medium, the code comprising code to:

instruct an analog-to-digital converter to perform a first analog-to-digital conversion;

read data associated with the first analog-to-digital conversion;

instruct the analog-to-digital converter to perform a second analog-to-digital conversion substantially simultaneous to the reading of the data associated with the first analog-to-digital conversion; and store data in a data structure located within a memory device while the analog-to-digital converter is performing the second analog-to-digital conversion.

10. The processor-readable software code of claim 9, the code further comprising code to:

monitor the received analog input signal to detect the start of a test event;

store a plurality of values associated with the received analog input signal in digital form;

sort the stored digital data; and determine if the device under test meets a predetermined characteristic threshold.

11. The processor-readable software code of claim 10, wherein the predetermined characteristic threshold is a predetermined voltage threshold.

12. The processor-readable software code of claim 10, the code further comprising code to:

display an indicia if it is determined that the device meets or exceeds a predetermined characteristic threshold.

13. The processor-readable software code of claim 10, the code further comprising code to:

display a first indicia if it is determined that the device under test meets the predetermined characteristic threshold; and display a second indicia if it is determined that the device under test does not meet the predetermined characteristic threshold.

14. The processor readable software code of claim 9, the code further comprising code to:

read data associated with the second analog-to-digital conversion using a processor; issue a command from the processor when the reading of the data has started, the command instructing the analog-to-digital converter to perform a third analog-to-digital conversion; and store data in the data structure located within the memory device while the analog-to-digital converter is performing the third analog-to-digital conversion.

15. A system for performing pipelined analog-to-digital conversions, the system comprising:

an analog-to-digital converter configured to perform analog-to-digital conversions;

a processor, the processor being configured to provide instructions to the analog-to-digital converter thereby instructing the analog-to-digital converter to begin an analog-to-digital conversion process, the instructions being provided when data from a previous analog-to-digital conversion is being read by the processor; and a memory, the memory being configured to store digital values associated with analog signals received at the analog-to-digital converter for further processing.

16. The system of claim 15, wherein the processor is configured to read digital data after an analog-to-digital conversion has taken place, the processor being configured to read the data and provide the instructions to the analog-to-digital converter using a single clock signal to perform both the reading of the digital data and provide instructions to the analog-to-digital converter.

17. The system of claim 15, further comprising:

a data structure stored on a computer-readable medium, the data structure being configured to receive the digital values associated with the analog signals received at the analog-to-digital converter for further processing.

18. The system of claim 15, wherein the system is configured to perform a first test on a device under test and a second test on the device under test, the apparatus further comprising:

a digitally programmable current load circuit, the digitally programmable current load circuit being configured to provide a first current load associated with the first test and a second current load associated with the second test.

19. An apparatus comprising:

an interface configured to receive signals from a device under test;

an analog-to-digital converter, the analog-to-digital converter being configured to perform a pipelined analog-to-digital conversion process based on signals received by the analog-to-digital converter;

a microprocessor, the microprocessor being configured to control the analog-to-digital converter and being configured to determine whether the voltage across the terminals of a device under test meet a predetermined threshold voltage;

a memory device, the memory device including software to filter noise from the voltage signal received from the device under test.

20. The apparatus of claim 19, further comprising:

an input device, the input device being configured to change a state of operation of apparatus.

21. The apparatus of claim 20, wherein the input device is a keypad and the state of operation of the apparatus includes a first testing condition and a second testing condition.

22. The apparatus of claim 19, further comprising an alphanumeric display.

23. The apparatus of claim 19, wherein the device under test is an aircraft weapons interface.

24. The apparatus of claim 19, wherein the apparatus is configured to perform a first test on the device under test and a second test on the device under test, the apparatus further comprising:

a digitally programmable current load circuit, the digitally programmable current load circuit being configured to provide a first current load associated with the first test and a second current load associated with the second test.

* * * * *